US008520990B2

(12) United States Patent
Lewis et al.

(10) Patent No.: US 8,520,990 B2
(45) Date of Patent: Aug. 27, 2013

(54) HIGH-POWER COLLIMATING LENS ASSEMBLIES, AND METHODS OF REDUCING THE OPTICAL POWER DENSITY IN COLLIMATING LENS ASSEMBLIES

(75) Inventors: Norris E. Lewis, Christiansburg, VA (US); Martin J. Oosterhuis, Blacksburg, VA (US); K. Peter Lo, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 12/733,960

(22) PCT Filed: Dec. 11, 2008

(86) PCT No.: PCT/US2008/013614

§ 371 (c)(1), (2), (4) Date: Mar. 31, 2010

(87) PCT Pub. No.: WO2010/050922

PCT Pub. Date: May 6, 2010

(65) Prior Publication Data

US 2011/0262072 A1 Oct. 27, 2011

(51) Int. Cl.

*G02B 6/32* (2006.01)
*G02B 6/26* (2006.01)
*G02B 6/42* (2006.01)

(52) U.S. Cl.

USPC .................. 385/35; 385/15; 385/25; 385/26; 385/31; 385/33; 385/34; 385/36; 385/39; 385/48; 385/50

(58) Field of Classification Search

USPC .................................. 385/26, 33, 34, 35, 48
See application file for complete search history.

(56) References Cited

U.S. PATENT DOCUMENTS

| | | | | |
|---|---|---|---|---|
| 5,991,478 | A | 11/1999 | Lewis et al. | |
| 6,301,405 | B1 | 10/2001 | Keil | |
| 6,385,367 | B1 | 5/2002 | Rogers et al. | |
| 6,453,088 | B1 | 9/2002 | Lewis et al. | |
| 6,758,935 | B2 * | 7/2004 | Bernard et al. | 156/272.8 |
| 6,813,416 | B2 * | 11/2004 | Pan | 385/39 |
| 6,980,714 | B2 | 12/2005 | Lo et al. | |
| 7,142,747 | B2 * | 11/2006 | Oosterhuis et al. | 385/26 |
| 7,239,776 | B2 | 7/2007 | Oosterhuis et al. | |

* cited by examiner

*Primary Examiner* — Ryan Lepisto
(74) *Attorney, Agent, or Firm* — Phillips Lytle LLP

(57) ABSTRACT

The present invention provides improved collimating lens assemblies (32) which include: a singlemode fiber (38) terminating in a distal end; a step-index multimode fiber (44) having a proximal end abutting to the singlemode fiber distal end, and having a distal end; a graded-index multimode fiber (45) having a proximal end abutting the step-index multimode fiber distal end, and having a distal end; and a collimating lens (34) longitudinally spaced from the graded-index multimode fiber distal end by an intermediate air gap (43), and operatively arranged to collimate light rays emanating from the graded-index multimode fiber distal end. The improved collimating lens assembly is characterized by the fact that there is no epoxy, silicone gel or index-matching material between the graded-index multimode fiber distal end and the collimating lens.

15 Claims, 3 Drawing Sheets

(Seven-channel FORJ with Arrayed Waveguide Gratings for Dense Wave Division Multiplexing)

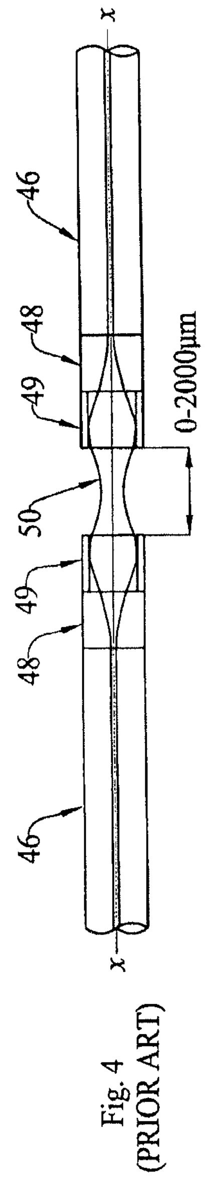
Fig. 4
(PRIOR ART)
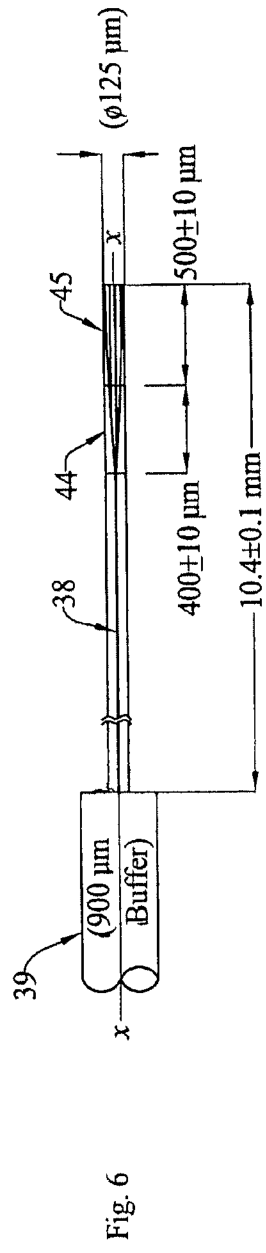
Fig. 6
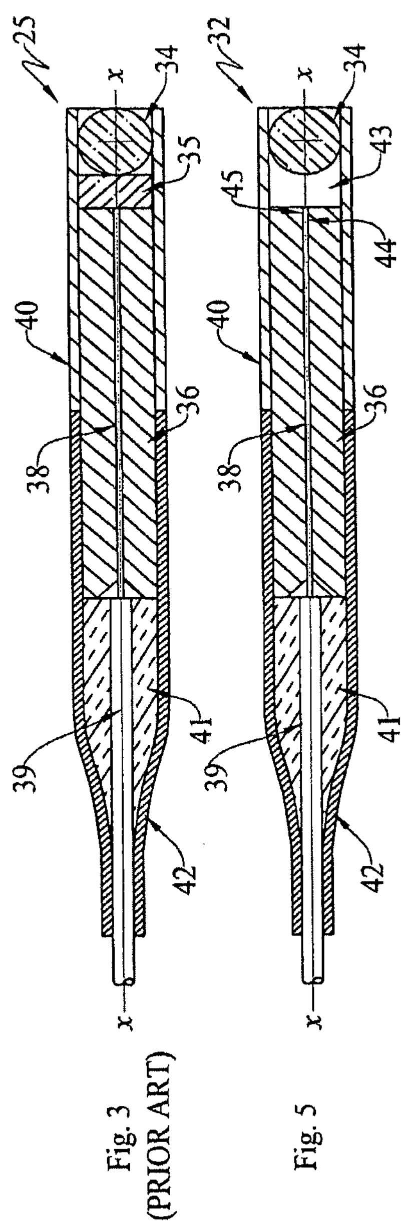
Fig. 3
(PRIOR ART)
Fig. 5

HIGH-POWER COLLIMATING LENS ASSEMBLIES, AND METHODS OF REDUCING THE OPTICAL POWER DENSITY IN COLLIMATING LENS ASSEMBLIES

TECHNICAL FIELD

The present invention relates generally to fiber optic rotary joints and collimating lens assemblies, and, more particularly, to improved high-power collimating lens assemblies for use in such fiber optic rotary joints that may employ various wave division multiplexing techniques; to improved fiber optic rotary joints that incorporate such improved collimating lens assemblies; and to improved methods of reducing the optical power density in such collimating lens assemblies.

BACKGROUND ART

Fiber optic collimating and focusing assemblies, sometimes known as collimators, are used to launch a beam of light from one optical fiber into free space, and then to capture such light and redirect it into another fiber. Collimators (i.e., optical devices for emitting parallel rays of light) are usually necessary whenever the free space propagation exceeds several hundred microns ("μm"; 1 μm=0.001 mm). For this reason, collimators are commonly used in fiber optic rotary joints ("FORJs"), such as shown and described in U.S. Pat. Nos. 6,301,405 B1, 7,142,747 B2 and 7,239,776 B2, the aggregate disclosures of each of which are hereby incorporated by reference. In a FORJ, the free space distance between the fiber optic collimating and focusing assemblies can be on the order of three to four inches [i.e., about 7.62 to about 10.16 cm].

In the past, collimator designs, such as shown and described in the aforesaid patents, have been selected for their simplicity, high pointing accuracy and reasonable optical performance. While such collimator designs have been sufficient for many conventional FORJs presently in use, there exists a desire to pass more and more data through existing FORJs.

Wavelength division multiplexing is a known technique for increasing the amount of data transmitted along an optical fiber. Basically, a plurality of input data signals are superimposed on a plurality of wavelength-separated optical carrier signals. The various optical signals are multiplexed, and are provided to the input end of an optical fiber. The multiplexed signals are transmitted along the fiber, and are demultiplexed at the exit end of the fiber back into the various component data signals. Wavelength division multiplexing is attractive because it allows a large amount of data to be transmitted along a single fiber by utilizing the bandwidth capability of the fiber. There are a number of known techniques. These include, but are not limited to: (1) conventional wavelength division multiplexing ("WDM"), (2) dense wavelength division multiplexing ("DWDM"), and (3) coarse wavelength division multiplexing ("CWDM"). Conventional WDM systems typically provide for up to sixteen channels in the third transmission window (C-band) of silica fibers at various wavelengths around 1550 nanometers ("nm"). DWDM systems typically use the same transmission window, but with denser channel spacing. CWDM systems, in contrast with conventional WDM and DWDM systems, use increased channel spacing to allow less-sophisticated and less-expensive optical multiplexer and transceiver designs. Thus, conventional WDM, DWDM and CWDM systems are based on the concept of using multiple wavelengths of light on a single fiber, but differ in the frequency of the wavelengths, the number of channels, and the ability to amplify the multiplexed signals in optical space. As used herein, the expression "wavelength division multiplexing" includes conventional WDM, DWDM, CWDM and similar techniques.

It is known to utilize wavelength division multiplexing to transmit data across fiber optic rotary joints. See, e.g., U.S. Pat. Nos. 5,991,478, 6,385,367 B1, 6,453,088 B1, 6,980,714 B2 and International Pat. Application No. PCT/US2006/016377 (published as Int. Pub. No. WO 2007/130016 A1), the aggregate disclosures of which are hereby incorporated by reference.

However, problems develop when high levels of optical power are transmitted through epoxy, silicone gel and/or index-matching media. For example, such epoxy and/or media will have a variable coefficient of thermal expansion, or a temperature-dependent refractive index that may adversely affect collimator performance. Moreover, exposure to high optical power densities can irreversibly darken the epoxy and/or the index-matching material. These detrimental effects have been observed at nominal power levels of about 256 milliwatts ("mW"). This represents a nominal energy density of about 3.41 gigawatts per square meter ("$GW/m^2$"), based on a 10 μm diameter singlemode fiber. Since about ninety percent of the energy in a single-mode fiber is carried in a mode field having a diameter of about 5.8 μm, the resultant energy density in this reduced-diameter field is about 8.6 $GW/m^2$. Testing has demonstrated that the maximum optical power capability of conventional collimators is approximately +15 dBm (i.e., about 30 mW). The typical requirements for WDM systems are well above this level.

In addition to volume effects (i.e., changes occurring within the optical path of the collimator), detrimental effects may occur on the surface of the singlemode fiber. This is particularly the case because the index-matching materials that would normally be in the interface between the singlemode fiber and the collimating ball lens, cannot be used. Because of the high energy density that exists on the surface of a singlemode fiber when a high power level is transmitted, contaminants (e.g., ceramic particles from ferrules and alignment sleeves, dust, and other contaminants) can be heated to temperatures higher than the melting point of silica, which may result in cracking and pitting of the fiber surface.

The high power transmission issue has been solved with the development of fusion-joint collimators where an end face of the singlemode optical fiber is fused directly to an abutting facing end face of a graded-index multimode lens, rather than being adhesively secured thereto, as by the use of an optical epoxy. However, there are inherent pointing accuracy issues with this type of design that precludes their use in a FORJ, where pointing accuracy is important.

Accordingly, it would be highly desirable to provide improved collimating lens assemblies that are suitable for use in FORJs and other applications, that can handle high power requirements, such as on the order of magnitude typically used for WDM, while still having a high degree of pointing accuracy, particularly when the optical signal will have to be propagated over several inches of free space from one fiber to another.

DISCLOSURE OF THE INVENTION

With parenthetical reference to the corresponding parts, portions or surfaces of the disclosed embodiments, merely for purposes of illustration and not by way of limitation, the present invention provides improved collimating lens assemblies, such as for use in (but not limited to) FORJs, to improved methods of reducing the optical power density in collimating lens assemblies, and to improved FORJs incorporating such improved collimating lens assemblies.

In one aspect, the invention provides an improved collimating lens assembly (32) having a longitudinal axis (x-x), which broadly includes: a singlemode fiber (38) that terminates in a distal end; a step-index multimode fiber (44) having a proximal end abutting to the singlemode fiber distal end, and having a distal end; a graded-index multimode fiber (45) having a proximal end abutting the step-index multimode fiber distal end, and having a distal end; and a collimating lens (34) longitudinally spaced from the graded-index multimode fiber distal end, and operatively arranged to collimate light rays emanating from the graded-index multimode fiber distal end.

The step-index multimode fiber proximal end may be fusion-spliced to the singlemode fiber distal end.

The graded-index multimode fiber proximal end may be fusion-spliced to the step-index multimode fiber distal end.

The collimating lens is preferably spaced from the graded-index multimode fiber distal end by an air gap (43).

The improved lens assembly may further include: a cylindrical ferrule (36) surrounding a marginal end portion of the singlemode fiber, the step-index multimode fiber (44), and the graded-index multimode fiber (45). A sleeve (40) may surround the ferrule. The axial length of the ferrule may be about 10.5 mm; the axial length of the singlemode fiber within the ferrule may be about 10.4±0.1 mm; the axial length of the step-index multimode fiber may be about 0.400±0.01 mm; the axial length of the graded-index multimode fiber may be about 0.500±0.01 mm; and the collimating lens may be spaced from the graded-index multimode fiber distal end by an axial distance of about 0.48±0.01 mm.

The improved collimating lens assembly is characterized by the fact that there is no epoxy, silicone gel or index-matching material in the optical path between the distal end of the singlemode fiber and the collimating lens.

In the improved collimating lens assembly, the step-index multimode fiber reduces the optical energy at the step-index multimode fiber distal end from that at the step-index multimode fiber proximal end, and the graded-index multimode fiber reduces the optical energy at the graded-index distal end from that at the graded-index multimode fiber proximal end.

The improved collimating lens assembly is capable of handling energy levels in the singlemode fiber that are typically used for wavelength division multiplexing. For example, the energy density in the expanded beam at the output of one particular collimating lens assembly is approximately twenty times lower than that at the singlemode fiber distal end. The reduction in energy density is not limited to this particular amount, as multimode fibers with larger-diameter cores could also be used.

In another aspect, the invention provides an improved method of reducing the optical power density in a collimating lens assembly (32) having a longitudinal axis (x-x). This method broadly includes the steps of: providing a singlemode fiber (38) terminating in a distal end; providing a step-index multimode fiber (44) having a proximal end and having a distal end; and positioning the singlemode fiber distal end to abut the step-index multimode fiber proximal end; providing a graded-index multimode fiber (45) having a proximal end and having a distal end; positioning the graded-index multimode fiber proximal end to abut the step-index multimode fiber distal end; providing a collimating lens (34); positioning the collimating lens in axially-spaced relation to the graded-index multimode fiber distal end; supplying optical power to the singlemode fiber at a density on the order of magnitude of that needed for one of wavelength division multiplexing and dense wavelength division multiplexing; reducing the optical power density at the graded-index multimode fiber distal end from that at the graded-index multimode fiber proximal end; and further reducing the optical power density at the step-index multimode fiber distal end from that at the step-index multimode fiber proximal end; thereby to cause collimated light of reduced optical power density to exit from the collimating lens assembly.

The singlemode fiber distal end may be fusion-spliced to the step-index multimode fiber proximal end, and the graded-index multimode fiber proximal end may be fusion-spliced the step-index multimode fiber distal end In still another aspect, the invention provides an improved FORJ (31), which is shown with arrayed waveguides for optical multiplexing and demultiplexing, that incorporates an improved collimating lens assembly (32). In this case, the FORJ has a first collimating lens assembly (25) spaced from, but optically aligned with, a second collimating lens assembly (25). The improvement broadly includes: each collimating lens assembly having an axis of elongation (x-x) and includes: a singlemode fiber (38) terminating in a distal end; a step-index multimode fiber (44) having a proximal end abutting the singlemode fiber distal end, and having a distal end; a graded-index multimode fiber (45) having a proximal end abutting the step-index multimode fiber distal end, and having a distal end; and a collimating lens (34) spaced from the graded-index multimode fiber distal end, and operatively arranged to collimate light rays emanating from the graded-index multimode fiber distal end; and wherein the collimating lens assemblies are arranged to face toward one another.

One of the lens assemblies may be angularly displaced with respect to the other of the lens assemblies about axis x-x, and the improved FORJ may further include a prism (28) arranged between the lens assemblies for optically aligning the lens assemblies such that light exiting one of the lens assemblies will be directed to enter a desired one of the other of the lens assembles.

These two collimating lens assemblies may be separated by a distance of from about three to four inches [i.e., about 7.62 cm to about 10.16 cm].

The method may further include at least one of an arrayed waveguide, an interference filter and a fiber Bragg grating, in connection with said one of said wavelength division multiplexing and said dense wavelength division multiplexing.

Accordingly, the general object of the invention is to provide improved collimating lens assembles.

Another object is to provide an improved method of reducing the optical power density in collimating lens assemblies.

Still another object is to provide improved FORJs that incorporate such improved collimating lens assembles.

These and other objects and advantages will become apparent from the foregoing and ongoing written specification, the drawings, and the appended claims.

BRIEF DESCRIPTION OF THE DRAWINGS

FIG. 3 is an enlarged fragmentary longitudinal vertical sectional view of a prior art collimating lens assembly that incorporates an index-matching media between the ferrule and ball lens.

FIG. 4 is a fragmentary longitudinal vertical outline view of a prior art fiber optic lens assembly used in a singlemode optical switch that can be used for DWDM applications.

FIG. 5 is an enlarged fragmentary longitudinal vertical sectional view of an improved collimating lens assembly that omits any index-matching element or use of epoxy in the optical path, and that has an air gap between the distal end of the ferrule and the ball lens.

FIG. 6 is a greatly-enlarged fragmentary longitudinal sectional view of a portion of the improved collimating lens assembly, this view showing the step-index multimode fiber as having been fusion-spliced to the distal end of the singlemode fiber, and showing the graded-index multimode fiber as having been fusion-spliced to the distal end of the step-index multimode fiber, to create a diverging ray trace for successively reducing the optical power density transmitted through the improved collimating lens.

DESCRIPTION OF THE PREFERRED EMBODIMENTS

Figure 1:
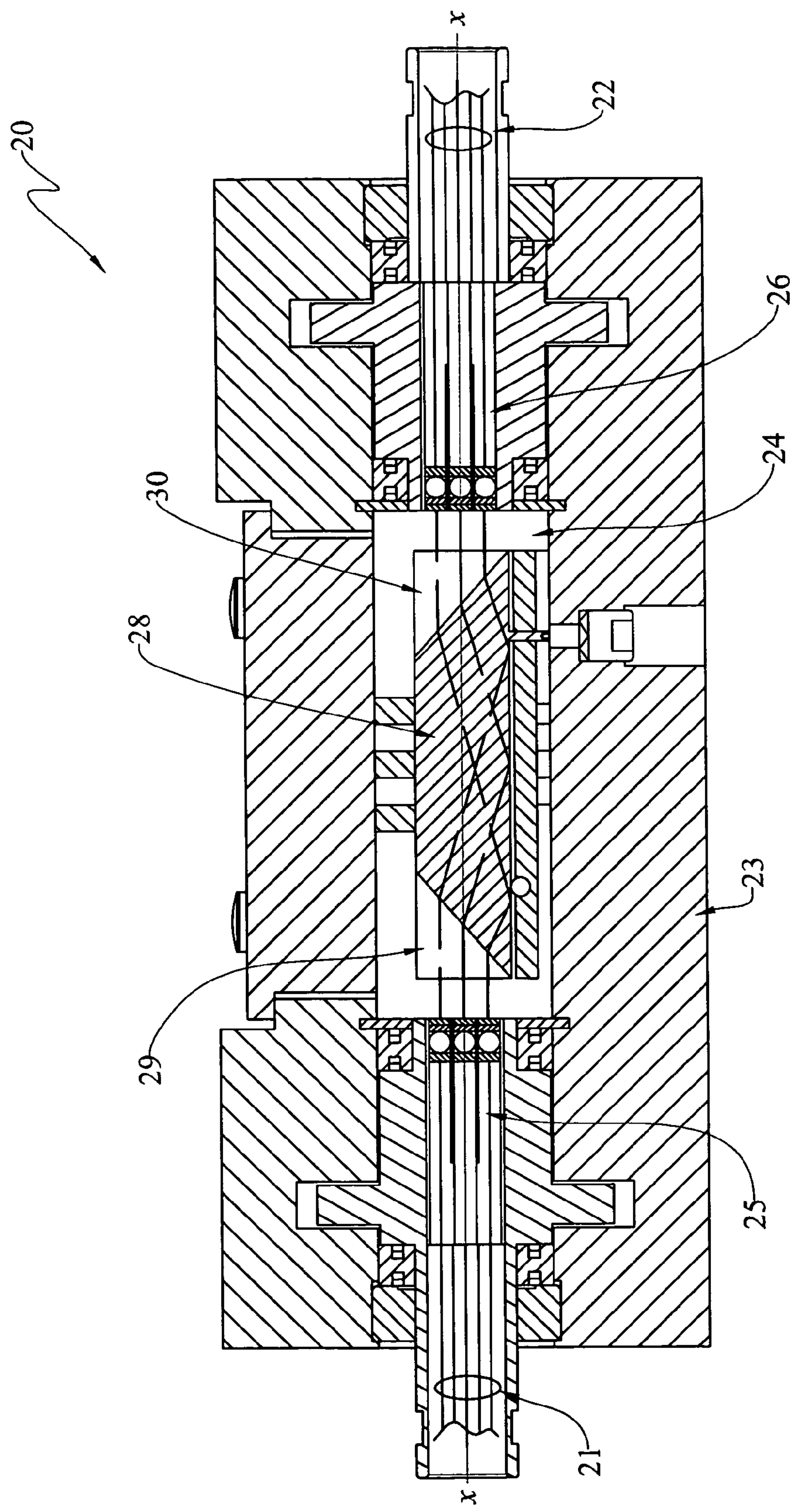
FIG. 1 is a fragmentary longitudinal vertical sectional view of a prior art fiber optic rotary joint, showing the presence of an intermediate dove prism that is arranged to rotate at half the relative rate of rotation of the opposing collimating lens assemblies, to maintain the optical alignment between respective opposing lens assembles at all relative angular positions therebetween.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, a prior art fiber optic rotary joint is generally indicated at 20. In fact, FIG. 1 is a substantial duplicate of FIG. 1 of U.S. Pat. No. 7,142,747 B2, which is assigned to the assignee of the present application. Since this FORJ has been fully described in the aforesaid '747 patent, a detailed description of such device will be omitted in favor of an abbreviated description herein. However, the reader is referred to the aforesaid '747 patent for a fuller and more complete written description of the structure and operation of such FORJ.

Suffice it to say that the FORJ shown in FIG. 1 is used to optically connect axially-spaced first and second bundles 21, 22 of optical fibers, while permitting at least one of the bundles to rotate about horizontal axis x-x relative to the other bundle. The FORJ includes a housing, generally indicated at 23, having a cavity 24 therewithin. For sub-sea applications, this cavity may be filled with an inert fluid, such as a halogenated hydrocarbon oil. However, this particular fluid is not required for all applications, and cavity 24 may, in some applications, be filled with other fluid(s), or even air.

The FORJ also includes first and second collimating lens assemblies, generally indicated at 25, 26, respectively. These collimating lens assemblies are generally positioned at the opposite longitudinal ends of internal cavity 24, for transmitting optical signals therethrough. A reversion prism, such as a Dove prism 28, is operatively arranged within the cavity 24, and is mechanically coupled by suitable means (not shown) to rotate at half of the rate of relative rotation between the lens assemblies 25, 26 so as to keep the various collimating lens assemblies of each array optically aligned with their respective mates at the opposite end of cavity 24, notwithstanding relative rotation of bundles 21, 22 about axis x-x. One mechanism for causing the Dove prism to rotate at half of the rate of relative rotation of the first and second arrays is more fully shown in U.S. Pat. No. 6,301,405, the aggregate disclosure of which is hereby incorporated by reference.

FIG. 1 shows ray traces of the paths of light from three of the first lens assemblies 25 through the Dove prism 28 to their respective counterparts 26 in the second array. Thus, light exiting the uppermost lens assembly of the first group passes through the Dove prism, and is directed into the lowermost lens assembly of the second array. Light exiting the middle lens assembly of the first array passes through the Dove prism, and is directed into the middle lens assembly of the second array. Finally, light exiting the lowermost lens assembly of the first array passes through the Dove prism, and is directed into the uppermost fiber of the second array.

The Dove prism is shown as having interface optical elements 29, 30, secured to its inclined faces. These interface optical elements have planar vertical surfaces that are arranged to face toward the proximate collimating lens assemblies, and are arranged perpendicularly to the various ray traces in cavity 24. The reason for this is to enable the optical signals to be transmitted along the various ray traces and to minimize the effect of variations in the index of refraction of any fluid within chamber 24. Such interface optical elements are more fully shown and described in the aforesaid U.S. Pat. No. 7,142,747 B2.

Thus, the FORJ depicted in FIG. 1 allows relative rotation of the collimating lens assemblies 25, 26 about horizontal axis x-x. The Dove prism maintains the optical communication between the respective emitting collimating lens assemblies and the respective receiving collimating lens assemblies at all permissible relative rotational positions of the opposed collimating lens assemblies 25, 26.

In this arrangement, the distance between the first and second arrays is typically on the order of about three to four inches [i.e., about 7.62 cm to about 10.16 cm]. Thus, each optical signal has to be propagated from an emitting lens assembly through free space to enter the reversion prism, be reflected therein and emitted therefrom, again through free space, toward a cooperative receiving lens assembly.

Figure 2:
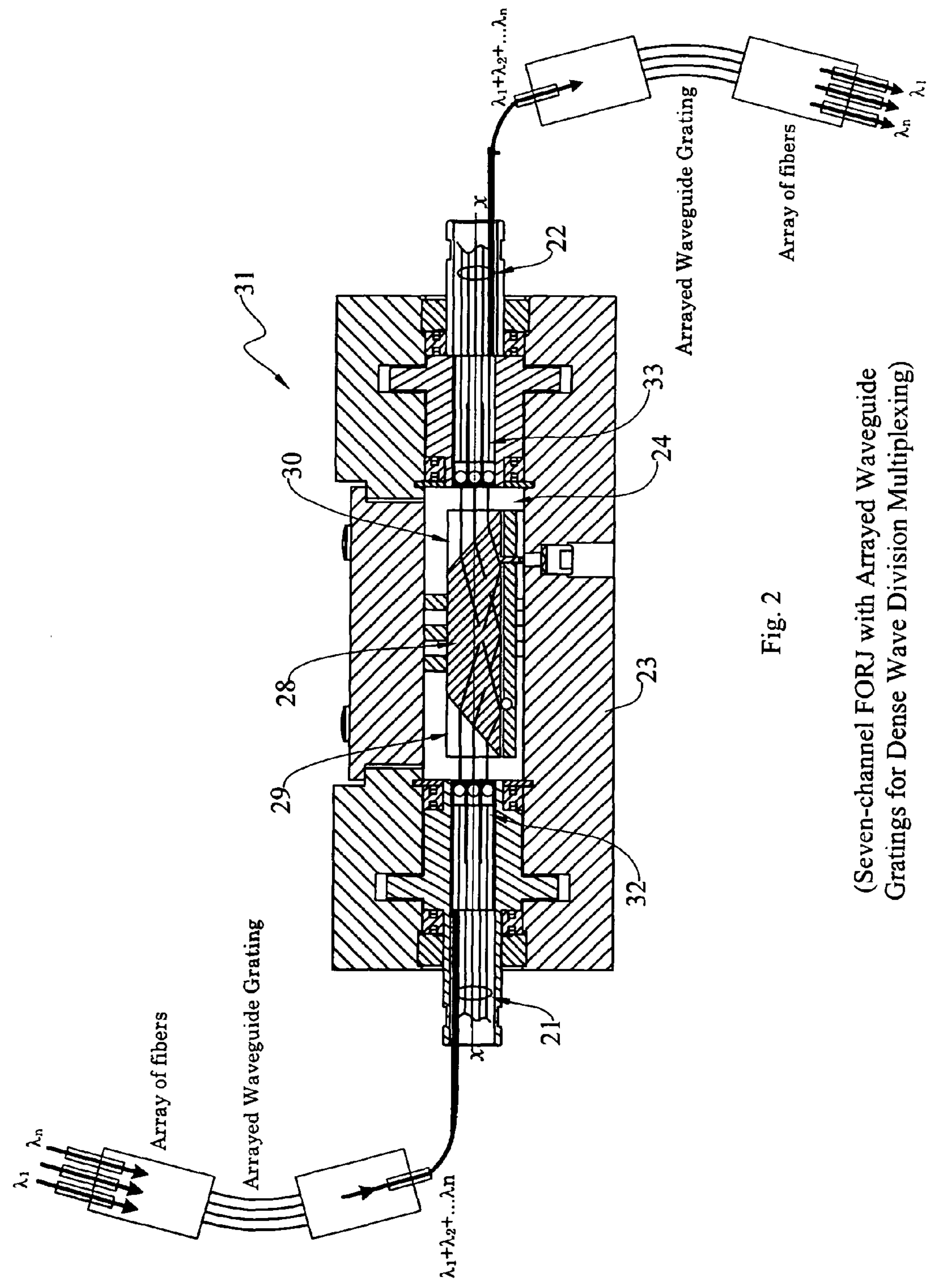
FIG. 2 is a reduced-scale fragmentary longitudinal vertical sectional view of an improved fiber optic rotary joint, generally similar to that shown in FIG. 1, but that incorporates improved collimator lens assemblies according to the present invention, and is shown with arrayed waveguides which is one technique used with DWDM.

FIG. 2 is a view generally similar to FIG. 1, of an improved fiber optic rotary joint, generally indicated at 31. The device shown in FIG. 2 is substantially the same as that shown in FIG. 1, except that the improved device uses improved collimating lens assemblies 32, 33, in lieu of those (25, 26) shown in FIG. 1. However, the device is still used to optically couple a first optical fiber bundle 21 to a relatively-rotatable second optical fiber bundle 22. The device is otherwise the same. It includes a housing 23, and a reversion prism, such as a Dove prism 28, with interface optical elements 29, 30 affixed to its inclined faces. The ray traces shown in FIG. 2 are the same as those shown in FIG. 1. As previously indicated, the salient difference between the improved FORJ (shown in FIG. 2), and the prior art FORJ (shown in FIG. 1) lies in the fact that the improved FORJ uses improved collimating lens assemblies 32, 33. These improved collimating lens assemblies are structurally identical, although one is arranged as a mirror image of the other. Light may be transmitted from left lens assembly 32 to right lens assembly 33, or vice versa. The FORJ is also shown with a DWDM capability utilizing an arrayed waveguide grating at its entrance and exit end, which will allow the device to transmit multiple signals of high bandwidth, and, thus, be an integral part of a variety of mobile platform applications. This type of arrayed waveguide grating is shown in a publication, "Introduction to DWDM Technology," Cisco Systems, Inc. San Jose, Calif., Text Part Number: OL-0884-01, Last Updated Jun. 4, 2001, chapter 2, "Fundamentals of DWDM technology."

FIG. 3 is a schematic longitudinal vertical sectional view of a prior art lens assembly 25, such as used in FIG. 1. The lens assembly shown in FIG. 3 is not completely identical with that shown in FIG. 1, but illustrates a form of lens that was actually used in such prior art FORJs. A variant form of this prior art lens assembly is shown in FIG. 3 of U.S. Pat. No. 7,142,747 B2, the aggregate disclosure of which is hereby incorporated by reference. The prior art lens assembly 25 illustrated herein has a collimating ball lens 34, an index-matching media 35 to the immediate left of the ball lens, and a horizontally-elongated cylindrical ferrule 36. A singlemode fiber 38 extends into the through-bore of ferrule 36. The rightward marginal end portion of this assembly is received in an outermost ceramic split sleeve 40. An epoxy or potting compound 41 holds the single-mode buffer 39 within outermost shrink tubing 42. In some cases, a clear epoxy or silicone gel 35 was used in the optical path that extends between the exit end of singlemode fiber 38 and ball lens 34.

As mentioned in the background of the invention, it is generally desired to use optical signals of increased power levels, such as would be necessary for various WDM applications. With the prior art arrangement shown in FIG. 3, such high power levels had the prospect of darkening, as well as changing the refractive index of, the epoxy, silicone gel and/or the index-matching material in the optical path between the exit end of the singlemode fiber and the collimating ball lens, with a subsequent concomitant decrease in optical performance. Moreover, contaminants could always be present that might ignite under the influence of such high power optical signals.

To solve this problem, Applicants have developed high-power collimating lens assemblies, of which one preferred embodiment is generally indicated at 32 in FIG. 5. The structure shown in FIG. 5 is similar to that shown in FIG. 3, and includes a collimating ball lens 34, and a horizontally-elongated cylindrical ferrule 36. A singlemode fiber 38 extends into the through-bore of ferrule 36. The rightward marginal end portion of this assembly is again received in an outermost ceramic split sleeve 40. An epoxy or potting compound 41 holds the singlemode buffer 39 within outermost shrink tubing 42.

The salient difference between the improved collimator lens assembly shown in FIG. 5 in the prior art lens assembly shown in FIG. 3 is that the index-matching element 35 and all optical epoxy and/or silicone gel has been omitted from the optical path between the distal end of the singlemode fiber 38 and ball lens 34. Rather, an air gap 43 exists in the improved lens assembly between the right marginal end of the ferrule 36 and the distal end of singlemode fiber 38 and the collimating ball lens 34. More importantly, as best shown in FIG. 6, the left or proximal end face of a cylindrical step-index multimode fiber 44 is fusion-spliced to the right or distal end face of singlemode fiber 38, and the left or proximal end face of a cylindrical graded-index multimode fiber 45 is fusion-spliced to the right or distal end face of step-index multimode fiber 44.

FIG. 6 is an enlarged fragmentary longitudinal vertical sectional view of a portion of the fiber lens assembly, with the ferrule, ceramic sleeve, potting compound and shrink tubing removed for clarity. Light discharged from the singlemode fiber 38 is directed first into the step-index multimode fiber 44, and then into the graded-index multimode fiber 45. It is then directed through air space 43 to collimating ball lens 34. Light exiting the singlemode fiber is shown as diverging as it passes through the step-index multimode fiber 44, and focusing and further diverging as it thereafter passes through the graded-index multimode fiber 45. Thus, the optical power density (i.e., optical power divided by transverse cross-sectional area) progressively decreases as the light proceeds rightwardly through the step-index and graded-index multimode fibers because the cross-sectional area through which the light passes progressively increases. Ultimately, light exiting the rightward end of the graded-index multimode fiber 45 passes through free space 43 to collimating ball lens 34.

U.S. Pat. No. 6,751,369 B1 discloses a fiber lens assembly for single-mode optical switches. FIG. 4 is a substantial reproduction of FIG. 4 of the '369 patent, and depicts a prior art arrangement discussed in the '369 patent in which light in the singlemode fiber 46 passes first through a step-index multimode fiber 48 and then through a graded-index multimode fiber 49. The beam waist of light exiting fiber 49 through its rightward end is represented by symbol 50. The light is then directed toward the entrance end of a second fiber 46, that is arranged as a mirror image of the left. Thus, light first passes through a graded-index multimode fiber 49 and then a step-index multimode fiber 48, and then into a receiving singlemode fiber 46. The distance between the two facing ends of these fibers was limited to a distance of about 0 to 2,000 microns, or about 0-2.0 millimeters. Thus, this type of arrangement is usable when the distance between the opposing lens assemblies is small. The '369 patent also discloses that the various multimode fibers are fused to one another. In the preferred embodiment of the present invention, the index-matching element 35 has been omitted, and the various facing surfaces of singlemode fiber 38, and multimode fibers, 44, 45, are fusion-spliced together. Suffice it to say that the absence of all such power-discolorable elements (i.e., the index-matching media, epoxy, silicone gel, etc.) in the optical path, removes the past impediments to the transmission of increased power through the improved lens assemblies.

Thus, the present invention broadly provides improved collimating lens assemblies, improved fiber optic rotary joints incorporating such improved lens assemblies, an improved methods of reducing the optical power density passes through the collimating light assemblies.

Modifications

The present application contemplates that many changes and modifications may be made without departing from the spirit of the invention. For example, it is presently preferred that the various optical elements (i.e., singlemode fiber 38, and step-index and graded-index multimode fibers 44, 45, respectively), all be fusion-spliced together. The salient point here is that all optical epoxy and/or silicone gel have been eliminated. Similarly, the present invention also omits the index-matching element, such as indicated at 35 in FIG. 3. As previously noted, these various members (i.e., the epoxy, the silicone gel, and the index-matching element) have been known to permanently discolor and change refractive indexes when high power levels, such as those required for wavelength division multiplexing, are used with a FORJ. Thus, by eliminating these members, Applicants have eliminated the principal impediment to use of higher optical densities and increased powers through the FORJ.

Therefore, while several embodiments of the invention have been shown and described, and various modifications thereof discussed, persons skilled in this art will readily appreciate that various additional changes and modifications may be made without departing from the spirit of the invention, as defined and differentiated in the following claims.

What is claimed is:

1. A collimating lens assembly having a longitudinal axis, consisting of:

a singlemode fiber terminating in a distal end;

a step-index multimode fiber having a proximal end abutting said singlemode fiber distal end, and having a distal end, said step-index multimode fiber being arranged to reduce the optical energy at said step-index multimode fiber distal end from that at said step-index multimode fiber proximal end;

a graded-index multimode fiber having a proximal end abutting said step-index multimode fiber distal end, and having a distal end, said graded-index multimode fiber being arranged to reduce the optical energy at said graded-index multimode fiber distal end from that at said grade-index multimode fiber proximal end; and a collimating lens longitudinally spaced from said graded-index multimode fiber distal end, and operatively arranged to collimate light rays emanating from said graded-index multimode fiber distal end; and wherein all elements having a temperature-dependent refractive index are omitted from the optical path between said singlemode fiber distal end and said collimating lens such that said collimating lens assembly is capable of handling energy levels in said singlemode fiber that are typically used for wavelength division multiplexing.

2. A collimating lens assembly as set forth in claim 1 wherein said step-index multimode fiber proximal end is fusion-spliced to said singlemode fiber distal end.

3. A collimating lens assembly as set forth in claim 1 wherein said graded-index multimode fiber proximal end is fusion-spliced to said step-index multimode fiber distal end.

4. A collimating lens assembly as set forth in claim 1 wherein the axial length of said singlemode fiber in said ferrule is about 10.4±0.1 mm.

5. A collimating lens assembly as set forth in claim 1 wherein the axial length of said step-index multimode fiber is about 0.400±0.01 mm.

6. A collimating lens assembly as set forth in claim 1 wherein the axial length of said graded-index multimode fiber is about 0.500±0.01 mm.

7. A collimating lens assembly as set forth in claim 1 wherein said collimating lens is spaced from said graded-index multimode fiber distal end by an axial distance of about 0.48±0.01 mm.

8. A collimating lens assembly as set forth in claim 1 wherein said energy density and the output of said lens assembly is approximately twenty times lower than that at the exit end of the singlemode fiber distal end.

9. The method of reducing the optical power density in a collimating lens assembly having a longitudinal axis, consisting of the steps of:

providing a singlemode fiber terminating in a distal end;

providing a step-index multimode fiber having a proximal end and having a distal end;

positioning said singlemode fiber distal end to abut said step-index multimode fiber proximal end;

providing a graded-index multimode fiber having a proximal end and having a distal end;

positioning said graded-index multimode fiber proximal end to abut said step-index multimode fiber distal end;

providing a collimating lens;

positioning said collimating lens in axially spaced relation to said graded-index multimode fiber distal end;

omitting all elements having a temperature-dependent refractive index from the optical path between said singlemode fiber distal end and said collimating lens such that said collimating lens assembly is capable of handling energy levels in said single-mode fiber that are typically used for wavelength division multiplexing;

supplying optical power to said singlemode fiber at a density on the order of magnitude of that needed for wavelength division multiplexing;

reducing the optical power density at said graded-index multimode fiber distal end from that at said graded-index multimode fiber proximal end; and further reducing the optical power density at said step-index multimode fiber distal end from that at said step-index multimode fiber proximal end;

thereby to cause collimated light of reduced optical power density to exit from said collimating lens.

10. The method as set forth in claim 9 wherein said singlemode fiber distal end is fusion-spliced to said step-index multimode fiber proximal end.

11. The method as set forth in claim 9 wherein said graded-index multimode fiber proximal end is fusion-spliced said step-index multimode fiber distal end.

12. The method as set forth in claim 9 wherein optical signals are transmitted along said fiber using a wavelength division multiplexing technique.

13. In a fiber optic rotary joint having a first collimating lens assembly spaced from, but optically aligned with, a second collimating lens assembly, the improvement which consists of:

each collimating lens assembly having an axis of elongation:

a singlemode fiber terminating in a distal end;

a step-index multimode fiber having a proximal end abutting said singlemode fiber distal end, and having a distal end, said step-index multimode fiber being arranged to reduce the optical energy at said step-index multimode fiber distal end from that at said step-index multimode fiber proximal end;

a graded-index multimode fiber having a proximal end abutting said step-index multimode fiber distal end, and having a distal end, said graded-index multimode fiber being arranged to reduce the optical energy at said graded-index multimode fiber distal end from that at said grade-index multimode fiber proximal end; and a collimating lens spaced from said graded-index multimode fiber distal end, and operatively arranged to collimate light rays emanating from said graded-index multimode fiber distal end; and wherein said collimating lens assemblies are arranged to face toward one another; and wherein one of said lens assemblies is angularly displaced with respect to the other of said lens assemblies; and a prism arranged between said lens assemblies for optically aligning said lens assemblies such that light exiting one of said lens assemblies will be directed to enter the other of said lens assemblies; and wherein all elements having a temperature-dependent refractive index are omitted from the optical path between said singlemode fiber distal end and said collimating lens such that said collimating lens assembly is capable of handling energy levels in said singlemode fiber that are typically used for wavelength division multiplexing.

14. The improvement as set forth in claim 13 wherein said collimating lens assemblies are separated by a distance of from about three to about four inches.

15. The improvement as set forth in claim 13 wherein optical signals are transmitted along said fiber using a wavelength division multiplexing technique.

* * * * *